Jan. 14, 1930.  E. A. DAVIS  1,743,657
RADIO APPARATUS
Filed Nov. 3, 1924
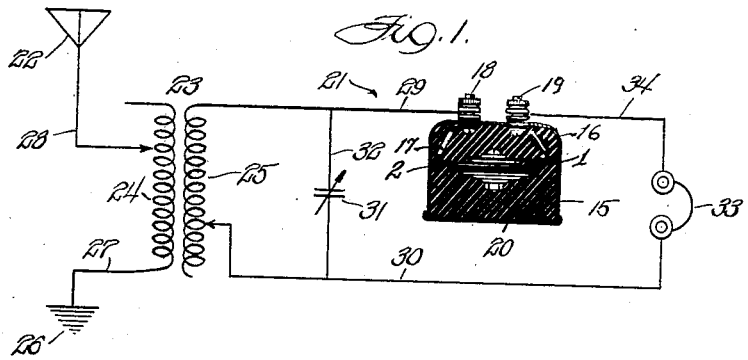
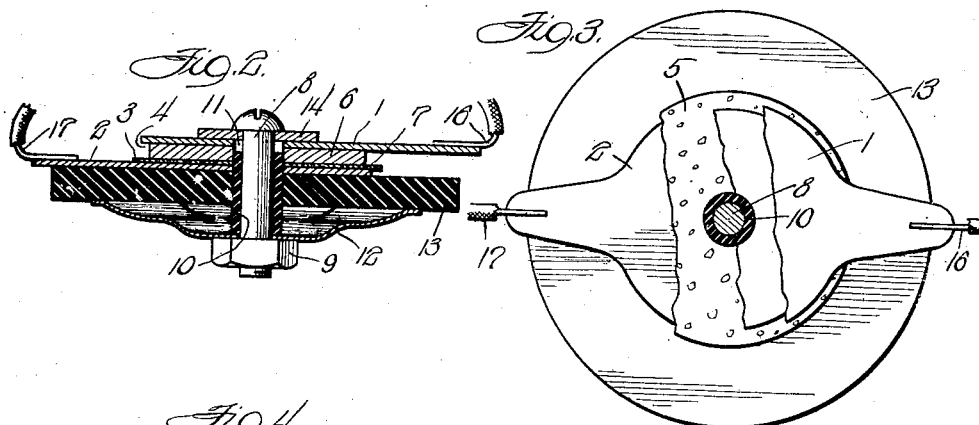
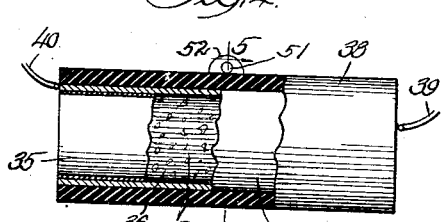
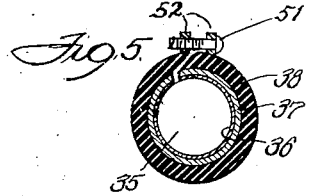
Witness:
W. X. Olson
Inventor:
Elmer A. Davis
By Harry Irwin Cromer
Atty.

Patented Jan. 14, 1930

1,743,657

UNITED STATES PATENT OFFICE

ELMER A. DAVIS, OF CHICAGO, ILLINOIS

RADIO APPARATUS

Application filed November 3, 1924. Serial No. 747,620.

This invention relates to that class of radio apparatus which is adapted to be used in connection with the reception of audible signals or sound waves.

The principal object of the invention is to provide a simple, economical and efficient detector or rectifier.

A further object of this invention is to provide an improved detector whereby an oscillating or pulsating electric current, such as the current in a circuit of a radio apparatus, may be so acted upon as to enable a telephone receiver or similar electrical device to be actuated, without the necessity of using an ordinary crystal detector or a vacuum tube as a detector, and without the necessity of adjusting a "cat-whisker" or similar element during the operation of the radio apparatus.

Other and further objects of the invention will appear from the following description and claims, and from an inspection of the accompanying drawings which are made a part hereof.

The invention consists in the features, combinations, arrangement of parts and details of construction herein described and claimed.

In the accompanying drawings—

Figure 1 is a diagrammatic view of a simple form of receiving circuit of a radio apparatus provided with a detector or means whereby the oscillations or waves of an electric current in such circuit are enabled to be changed or acted upon in such a manner as to enable a telephone receiver to be actuated, or whereby an audible signal or sound may be made, detected or received in accordance with my invention;

Fig. 2 is an enlarged detail view in central vertical section of my improved detector or oscillation transforming or changing means shown in Fig. 1;

Fig. 3 is a plan view of the device or mechanism shown in Fig. 2, with parts broken away or omitted for the purpose of more clearly illustrating the construction and arrangement of parts;

Fig. 4 is a view in elevation of a modified form of my improved device, showing the same constructed in cylindrical form, with parts broken away for the purpose of illustration;

Fig. 5 is a view in transverse section of the device shown in Fig. 4, taken on line 5—5 of said figure;

In constructing a radio apparatus, or a detector or rectifier therefor, in accordance with my invention, I provide a plurality of electric conductors or electrodes,—such, for example, as conductors 1 and 2,—of which there may be two or more, each adapted to be operatively connected with an electric circuit, such, for example, as the receiving circuit of a radio apparatus.

These conductors are arranged in close proximity to each other, and are of such form and dimensions as to have or afford the required conductivity when operatively connected with such a circuit, to enable the circuit or apparatus to operate in an efficient manner for the purposes for which it is intended.

Said conductors or electrodes are, by preference, in the form of plates, tubes, or sheets of solid metallic or electrically conductive material, such, for example as copper, brass, iron, galena, or of material containing one or more of said elements, or other or equivalent electrically conductive substance or material, having surfaces of suitable area, form and dimensions arranged in close proximity to each other, and suitably spaced apart to enable an intermediate dielectric element 3 and suitable intermediate electric conductors 5 embedded in and insulated from each other by said dielectric element, to be mounted in the space 4 between said surfaces, as hereinafter more particularly described.

An intermediate dielectric element 3 is provided, which is by preference, formed of somewhat compressible flexible fibrous dielectric sheet material, such, for example, as thin tissue paper, tracing cloth, linen, or similar sheet material, which may be impregnated or coated with paraffin, or other dielectric material.

The dielectric element 3 is interposed between the opposed surfaces of the metallic plates or electrodes 1 and 2, and is adapted to engage and hold said plates in spaced-apart relation to each other and to enable the embedded granular conductors 5 to be held in operative position in permanent fixed electrically conductive connection with said metallic plates, but, by preference, insulated from each other.

The intermediate electrically conductive means for forming the desired electric conductivity or electrically conductive connection between the spaced-apart conductors or electrodes 1 and 2 and through the intermediate dielectric element or sheet 3, is by preference, in the form of a plurality or multiplicity of relatively small conductors or granules 5 of metal or equivalent electrically conductive material interposed between the opposed surfaces of the conductors or electrodes 1 and 2 in the space 4, and, by preference, embedded in the sheet of compressible dielectric material 3 already described, and extending through or partially through said dielectric and adapted to form the desired electrically conductive connection between the opposed surfaces of said conductors 1 and 2. The granules 5 are thus adapted to be held in contact with and to form one or more continuous electrically conductive connections between the opposed surfaces of said conductors 1 and 2 suitable for enabling the current to be rectified.

These intermediate conductors 5 are by preference, in the form of small particles or separate granules of electrically conductive material, such, for example, as finely divided particles of pyrites, quartz, silicon, carbon, iron filings, or fragments of rectifying crystals—preferably the latter.

These intermediate conductors 5, of which there may be one or any desired number, preferably a plurality or multiplicity, have surfaces and corners or edges which may be angular and irregular. These conductors 5 are embedded in and partially or wholly insulated from each other by the sheet of dielectric material 3. And one or more of said granular conductors, or fragments of rectifying crystals 5, extend through the dielectric material and into electrically conductive contact or engagement with said metallic conductor plates 1 and 2, the dielectric element or sheet 3 being between and in contact with the inner faces of both of said metallic plates 1 and 2, which are adjustably secured in fixed rigid contact and operative engagement with the opposite sides of said dielectric element by means of a headed screw 8 which extends through central openings in said conductors 1 and 2 and said dielectric element or sheet 3, and a nut 9 in threaded engagement with said screw, or other suitable or equivalent securing means adapted to adjust and press said plates 1 and 2 in fixed rigid engagement with the opposite sides of said dielectric and in electrically conductive contact with one or more of said intermediate granular conductors or crystals 5. Said connected elements thus comprise or include simple and efficient means for providing unilateral conductivity between or from one to the other of said conductors 1 and 2, and for rectifying and detecting the oscillations or waves of an oscillating or pulsating current in the circuit of a radio apparatus within which said connected elements are embraced.

In the form of the device shown in Figs. 1 to 3 inclusive, an intermediate conductor member or plate 6, which may be of iron or other conductive material, is in contact with or may form a part of the conductor 1, and is located between the copper plate or layer of said conductor and the dielectric 3 and granules or conductors 5. Either or both of the conductors 1 and 2 may be laminated and the laminations or layers may be of different materials and conductivity.

An insulating sleeve or tube 10 of fiber or other suitable insulating material is inserted in the opening 11 and encircles the screw 8, thus forming an insulation between said screw and the electrically conductive members or elements through which the screw extends, including the parts 1, 2, 3, 5, and 6 already described. A metallic plate or washer 12, and an insulating plate 13 of fiber or hard rubber or other suitable insulating material, may be interposed between the nut 9 and the adjacent metallic plate or electrode 2 and in position to encircle the bolt 8 and sleeve 10, the insulation 13 being between the metallic washer 12 and said electrode 2. (See Fig. 2.) A washer 14 may also be interposed between the head of the screw 10 and the adjacent electric conductor, for example, between the headed screw and the conductor 1. (See Fig. 2.)

The assembled parts above described, are, by preference placed in a suitable container or casing 15, which may be formed of sheet metal, insulating material, or of any desired suitable material, and should be water-proof.

The container 15 is, by preference, provided with binding posts 18 and 19, properly insulated, and of any suitable ordinary and well known form. And conductor wires 16 and 17 are connected with these binding posts, respectively, and may be located inside of the container 15. The container 15 may be filled with insulating material, such, for example, as resin 20, poured into the container in a molten condition and surrounding and submerging the detector or rectifier device above described, which is, by preference, mounted in such container, or in a suitable inclosed water-proof container or casing which may be of any desired ordinary and well known or suitable form.

The device will operate successfully however without being in such a container, and without being surrounded with insulating material such as the resin 20, or with any insulating material other than air. And it will operate with satisfactory results and very successfully without the resilient element 12, or with said resilient element held rigidly between insulating elements, such, for exmaple, as the insulating plate 13 and resin 20.

A receiving circuit 21 shown in Fig. 1, which is an ordinary and well known form of receiving circuit for radio apparatus, consists of or comprises the usual antenna 22, which is electrically connected in the usual manner with a tuning coil or loose coupler 23 which may be of any ordinary and well known or desired form, and comprises the usual primary coil 24, and secondary or induction coil 25. The coil 24 of the coupler 23 is electrically connected with the ground 26 by a ground wire or conductor 27 suitably insulated. And the usual lead-in wire 28 connects the coil 24 with the antenna.

A wire 29 is connected at one end with the binding post 18 and conductor wire 17 and thereby with the conductor 2 already described. The other end of said wire 29 being connected with one of the terminals of the coil 25. A wire 30 leads from or is operatively connected with the coil 23 in the usual manner, or by any desired ordinary and well known connecting means. And a variable condenser, which may be of any ordinary and well known or suitable form, is connected with wire 30 by means of a wire 31, and with wire 29, by means of a wire 32. A telephone receiver 33, which may be of any ordinary known or suitable form, is connected in the usual manner with wire 30, leading to the coil 25. And an electric wire of conductor 34 is connected at one end with the binding post 19 already described, and thereby with the conductor wire 16 and conductor or electrode 1. The opposite end of said wire 34 is connected with the telephone receiver 33 in the usual or any desired ordinary and well known manner.

The circuit above described, being of an ordinary and well known form, and such circuits being in common use and well known to those skilled in the art to which this invention relates, it is believed to be unnecessary and undesirable to further describe said circuit in detail.

In Figs. 4 and 5 is shown a modified form of my improved detector or rectifier device constructed in accordance with or containing my invention, in which an inner metallic conductor 35 which may be in the form of a copper rod, corresponds with one of the conductors 1 or 2, for example, conductor 1 already described, but without the iron conductor member 6. A sheet of dielectric material 36 in the form of a tube of thin tissue paper or tracing cloth, corresponds with the dielectric element 3 already described, and is provided with a multiplicity of detached separate intermediate conductors 5 embedded in the opposite sides of said dielectric, and in the form of metallic granules or filings or equivalent elements insulated from each other by the dielectric 36 and in contact with an adjacent metallic tube or conductor 37 which surrounds and is in contact with the dielectric tube member 36 and the granular conductors 5 thereon or embedded in said dielectric. A tube 38 of fiber or other suitable insulating mateial, surrounds and forms a protecting covering or casing for the tube 37 engaged thereby, and for the other members within said tubes 37 and 38. The conductor 35 is provided with a conductor or connecting wire 39 which corresponds with wire 16 already described; and the inner tubular conductor or electrode 37 is provided with a connecting wire 40 for connecting it with the circuit. Wire 40 corresponds with wire 17 already described.

I claim:

1. In a radio apparatus of the class described, the combination of a pair of spaced-apart electric conductors both formed of solid electrically conductive material and adapted to be secured in fixed relation to each other, intermediate electrically conductive means comprising a plurality of relatively small electric conductors having unilateral coductivity and adapted to form an electrical connection between said first-mentioned spaced-apart conductors, and a dielectric element between and in engagement with the opposed faces of both of said first-mentioned spaced-apart conductors and in engagement with and acting to hold said intermediate electrically conductive means in permanent fixed relation to and in electrically conductive engagement with said first-mentioned conductors.

2. In a radio apparatus of the class described, the combination of a pair of spaced-apart electric conductor members adapted to be connected in an electric circuit of a radio apparatus, intermediate electrically conductive means comprising a plurality of relatively small electric conductors having unilateral conductivity and adapted to provide a restricted electrically-conductive connection between said spaced-apart electric conductor members, a dielectric element in engagement with the inner faces of both of said first-mentioned spaced-apart conductor members and acting to hold said intermediate electrically conductive means in permanent fixed relation to and in electrically conductive connection with said first-mentioned electric conductor members, and means for securing said first-mentioned electric conductor members in fixed rigid engagement with both sides of said dielectric element and in fixed relation to each other.

3. In an apparatus of the class described, the combination of a pair of spaced-apart electric conductor members adapted to be connected in an electric circuit of a radio apparatus, intermediate electrically conductive means comprising a plurality of relatively small intermediate electric conductors having unilateral conductivity and adapted to provide an electrically conductive connection between said first-mentioned spaced-apart electrically conductive members, a dielectric element formed of fibrous non-conductive material adapted to insulate said intermediate electric conductors from each other and acting to hold said intermediate electrically conductive means in permanent fixed relation to and in electrically conductive connection with said first-mentioned spaced-apart electric conductor members, and means for supporting said first-mentioned electric conductor members in operative position.

4. In a radio apparatus of the class described, the combination of a pair of spaced-apart electric conductor members adapted to be secured in fixed relation to each other and connected in an electric circuit of a radio apparatus, intermediate electrically conductive means comprising a granular conductor having unilateral conductivity and adapted to engage and form an electrically conductive connection between said first-mentioned spaced-apart electric conductor members, an intermediate dielectric member in engagement with the inner faces of both of said first-mentioned spaced-apart conductor members and in engagement with and acting to hold said granular conductor in permanent fixed relation to and in electrically conductive connection with said first-mentioned spaced-apart electric conductors, and adjustable securing means, for adjustably securing said first-mentioned spaced-apart conductors in fixed relation to each other and in fixed rigid engagement with both sides of the dielectric member and with said intermediate electrically conductive means.

5. In a radio apparatus, the combination of a pair of spaced-apart electric conductors adapted to be connected in an electric circuit of a radio apparatus, intermediate electrically conductive means comprising a series of granular conductors having unilateral conductivity adapted to provide an electrical connection between said first-mentioned spaced-apart electric conductors, an intermediate dielectric member formed of a sheet of compressible material in which said granular conductors are embedded, said dielectric member being adapted to hold said granular conductors in permanent operative position between and in fixed relation to said first-mentioned spaced-apart electric conductors, and screw-threaded securing means in operative engagement with and adapted to permit the initial adjustment of the said first-mentioned electric conductors into operative position with respect to the granular conductors and dielectric member, and acting to securely hold said first-mentioned spaced-apart conductors in permanent rigid operative position relatively to each other and in fixed rigid engagement with the opposite sides of said dielectric and in fixed relation to said granular conductors.

Signed at Chicago, in the county of Cook and State of Illinois this 31st day of October, 1924.

ELMER A. DAVIS.